(12) United States Patent
Hidaka

(10) Patent No.: US 7,450,326 B2
(45) Date of Patent: Nov. 11, 2008

(54) METHOD TO DETERMINE TEMPERATURE DEPENDENT WRITE PRE-COMPENSATION IN A HARD DISK DRIVE

(75) Inventor: Fumitoshi Hidaka, Nishiuwa-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 175 days.

(21) Appl. No.: 11/095,857

(22) Filed: Mar. 31, 2005

(65) Prior Publication Data

US 2006/0221487 A1   Oct. 5, 2006

(51) Int. Cl.
*G11B 27/36* (2006.01)
*G11B 5/09* (2006.01)

(52) U.S. Cl. .............................. 360/31; 360/46; 360/51
(58) Field of Classification Search ....................... None
See application file for complete search history.

(56) References Cited

U.S. PATENT DOCUMENTS

| | | | | |
|---|---|---|---|---|
| 6,101,053 A * | 8/2000 | Takahashi | .................... | 360/46 |
| 6,124,998 A * | 9/2000 | Kanegae | ....................... | 360/68 |
| 6,731,453 B2 * | 5/2004 | Korbel et al. | ............ | 360/78.04 |
| 6,760,171 B2 | 7/2004 | Stein | | |
| 6,788,481 B2 | 9/2004 | Fang et al. | | |
| 6,954,320 B2 * | 10/2005 | Yang | ........................... | 360/46 |
| 6,995,933 B1 * | 2/2006 | Codilian et al. | ............... | 360/46 |
| 2002/0105748 A1 * | 8/2002 | Lamberts | ..................... | 360/69 |

* cited by examiner

*Primary Examiner*—Joseph H Feild
*Assistant Examiner*—Daniell L Negrón
(74) *Attorney, Agent, or Firm*—Fliesler Meyer LLP

(57) ABSTRACT

Methods in accordance with the present invention can include determining a plurality of sets of write pre-compensation parameters. At baseline conditions, the hard disk drive can apply a first current and write pre-compensation parameters can be tuned to generate a desired write current waveform that can be applied to the read/write head to generate a magnetic field to define magnetization on the magnetic media. The hard disk drive can then apply a second current and write pre-compensation parameters can be tuned to generate the desired write current waveforms. A plurality of write pre-compensation parameters can then be generated based on the results for a plurality of corresponding temperatures and/or temperature ranges.

6 Claims, 10 Drawing Sheets

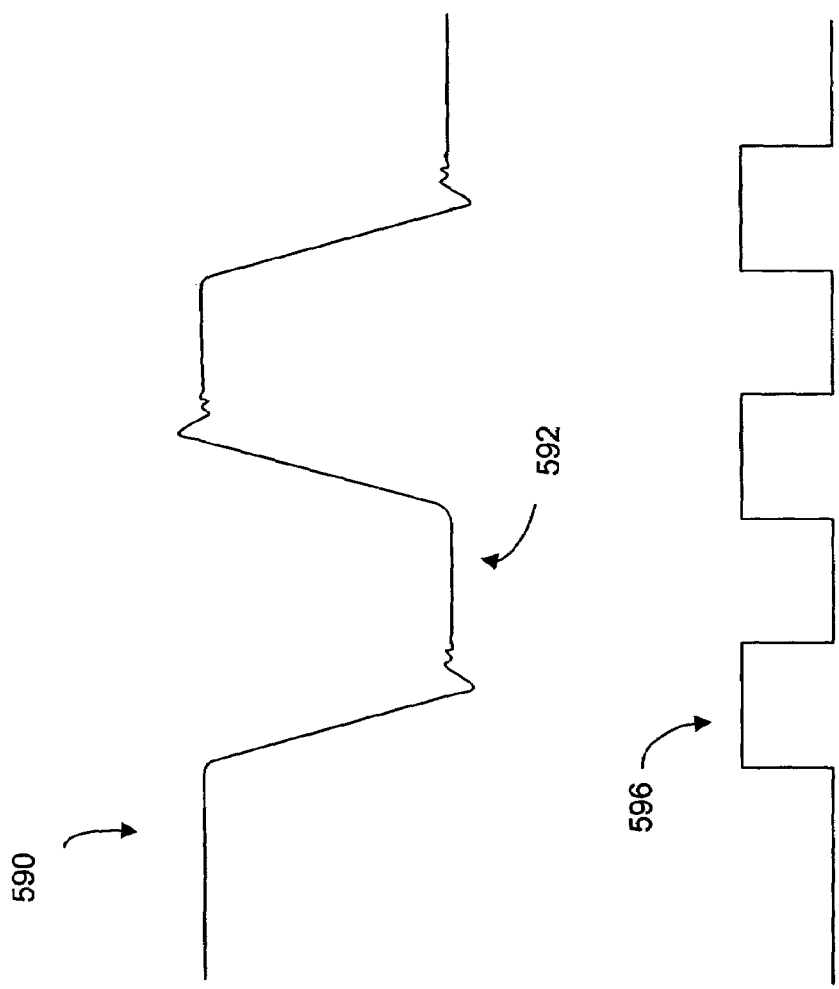

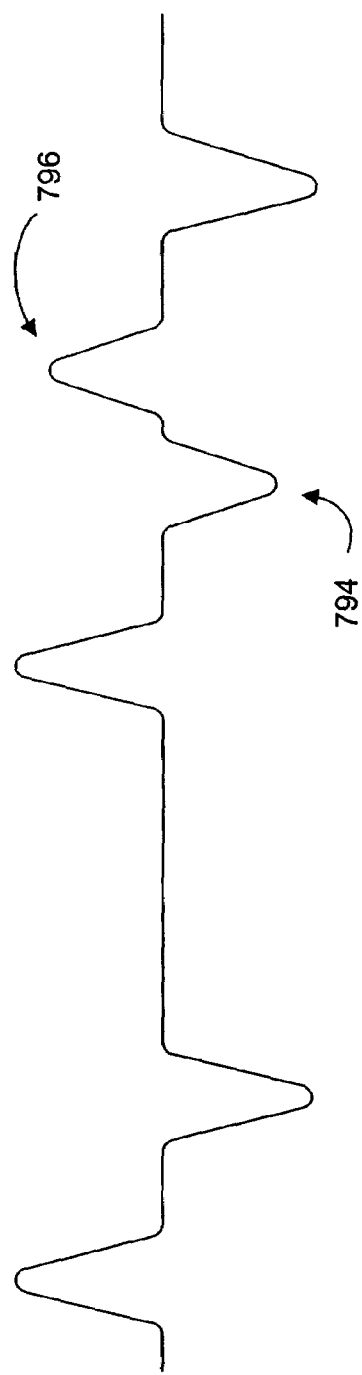
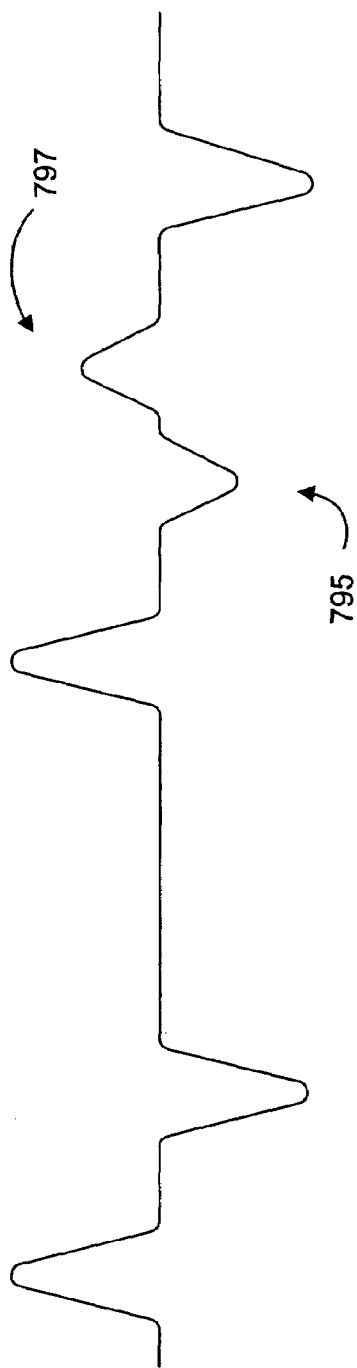

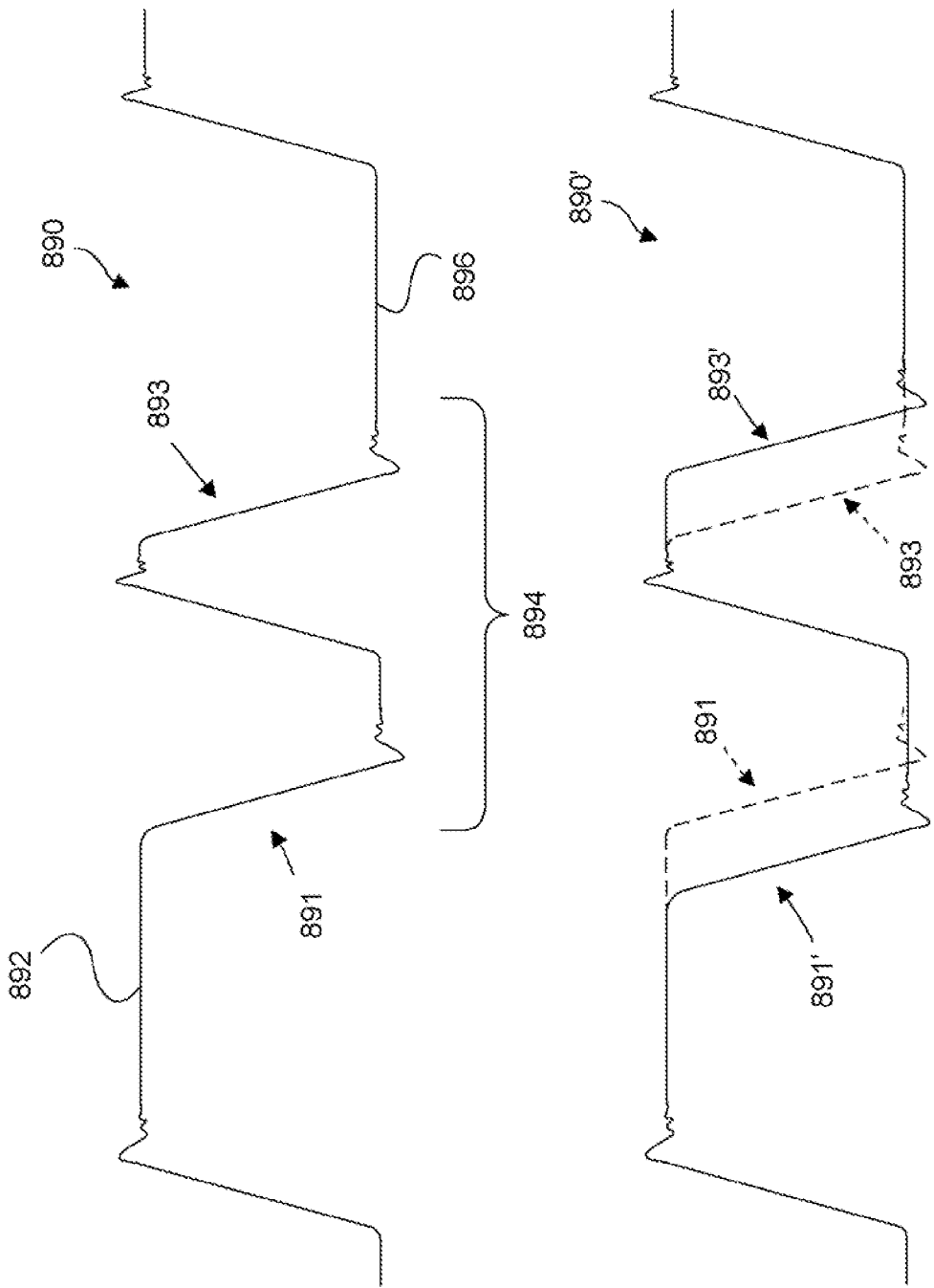

METHOD TO DETERMINE TEMPERATURE DEPENDENT WRITE PRE-COMPENSATION IN A HARD DISK DRIVE

TECHNICAL FIELD

This invention relates to magnetic recording of information.

BACKGROUND

A known property of magnetization is that magnetized materials are magnetically "harder" at cold temperatures. Conversely, magnetized materials become magnetically "softer" at high temperatures. The Curie temperature of a ferromagnetic material is a temperature above which the material loses its permanent magnetism. When a magnetized material is heated to the material's Curie temperature, the material typically does not hold magnetization. As a result of this material property, magnetic writing of a domain on a magnetizable material using a read/write head requires that less current be driven through the read/write head as the temperature of the material increases (i.e., at a higher temperature a relatively smaller magnetic field is required to switch the magnetization of the magnetic material). As the temperature of the magnetizable material decreases, magnetic writing of a domain using a read/write head requires more current (i.e., at a lower temperature a relatively larger magnetic field is required to switch the magnetization of the magnetic material).

A hard disk drive (HDD) can fail at extreme temperatures for a number of mechanical reasons: a fluid spindle with which a magnetic recording material (also referred to herein as a media) is associated might freeze (i.e., seize), or fluid within a fluid bearing of the fluid spindle can become very viscous. However, it is also possible for the HDD to spin up and for the read/write head of the HDD to read data from the magnetic recording material perfectly well, but be unable to write well to the magnetic recording material because of an insufficient write current.

Some mobile HDDs include a temperature sensor. When a low temperature threshold is reached, the HDD will apply an increased write current (relative to a write current applied at a baseline temperature, e.g., 35 degrees C.). An increase in write current amplitude can cause transitions in magnetization to "smear," or writing with an increased write current amplitude can cause the written domain to be wider than desired. However, if the temperature is below a low temperature threshold, an increased current amplitude may be required to cause the magnetization to switch. Increasing current amplitude is one knob that can be adjusted to improve writing at cold temperatures.

Some pre-amplification circuits allow adjustments in circuitry that can control an edge break of the write current. When applying a write current, there is a finite transient during which the write current increases (or decreases) from zero to a positive (or negative) current, or goes from full current in one direction to full current in the other direction. The write current typically includes some overshoot. Parameters of the pre-amplification circuit can be applied to adjust the rate of the edge break, and further affect the overshoot. In some circumstances, overshoot is preferred because such overshoot can improve switching of the magnetization of the magnetic recording material. Overshoot can thus be deliberately incorporated to improve writing at low temperatures.

SUMMARY OF THE INVENTION

A method to determine a low temperature set of write pre-compensation parameters for a read/write head writing to a magnetizable material comprises applying a first write current to the read/write head at a first temperature, tuning the read/write head to obtain a first set of write pre-compensation parameters, applying a second write current to the read/write head at a second temperature, and tuning the read/write head to obtain a second set of write pre-compensation parameters. The low temperature set of write pre-compensation parameters is then determined based on the first set and second set of write pre-compensation parameters. The first set and second set of write pre-compensation parameters instruct a read/write channel to modify placement of transitions relative to the clock cycle.

BRIEF DESCRIPTION OF THE DRAWINGS

FIG. 5A is a write current waveform having a plurality of current transitions.

FIG. 5B is a plot showing a plurality of pulses measured when a pattern written using the write current waveform of FIG. 5A is read, the plurality of pulses being defined by a current transition.

FIG. 7A is a plot showing a desired transducer signal of a pattern written using a write current waveform without nonlinear interference is read.

FIG. 7B is a plot showing a resulting transducer signal of the pattern written using the write current waveform as applied in FIG. 7A with nonlinear interference is read.

FIG. 8A is a write current waveform having a plurality of current transitions arranged in relatively close proximity such that nonlinear interference causes the resulting pulses to be forced apart.

FIG. 8B is a modified write current waveform having a plurality of current transitions arranged to include shifts in transition proximity to minify nonlinear interference.

DETAILED DESCRIPTION

Figure 1:
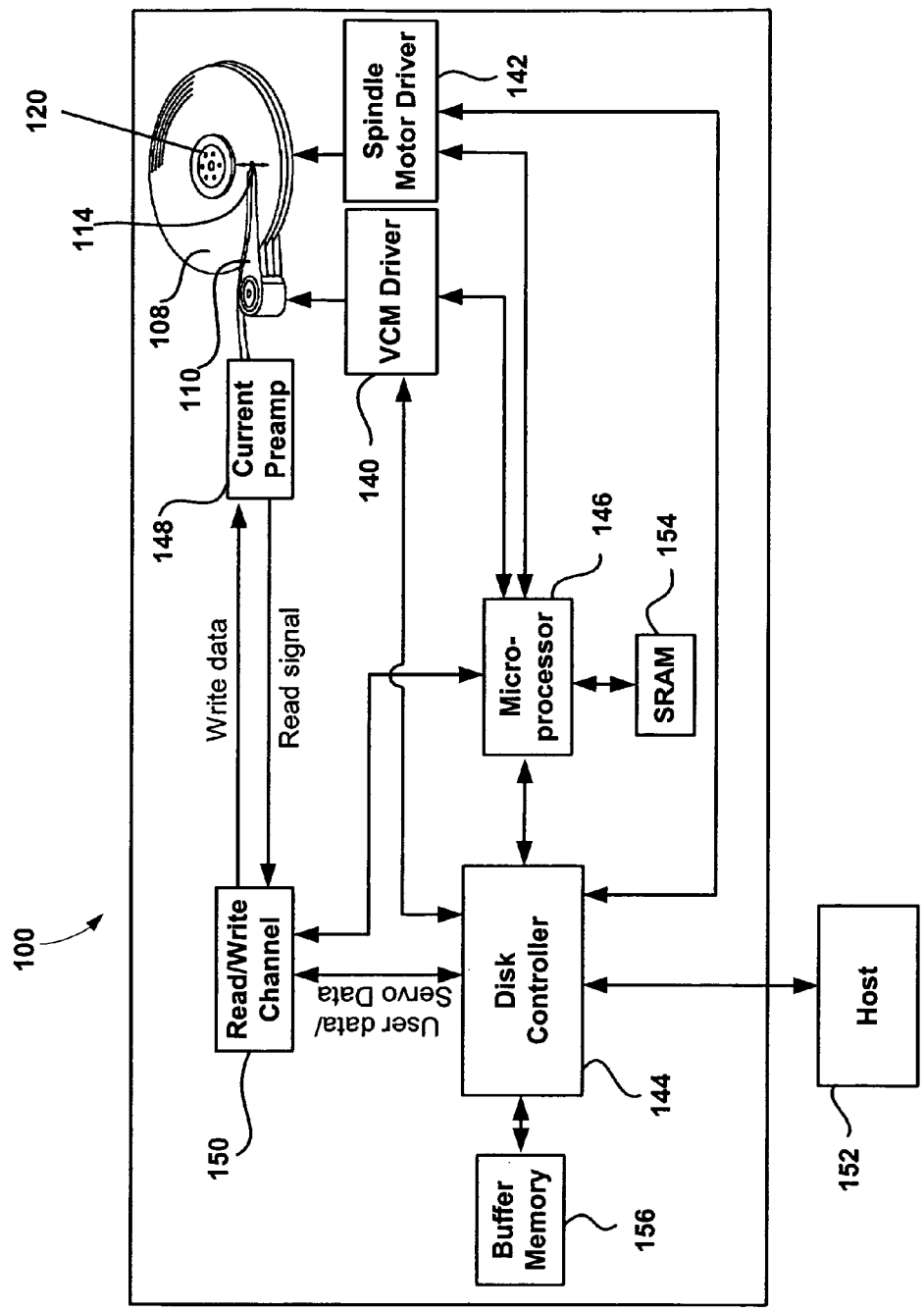
FIG. 1 is a control schematic of a typical HDD for applying a method in accordance with an embodiment of the present invention.

FIG. 1 is an exemplary control schematic of an HDD 100 for use with embodiments of methods in accordance with the present invention. The HDD 100 includes a disk 108 attached to a rotatable spindle motor 120, for example by clamping.

The disk 108 can be made of a light aluminum alloy, ceramic/glass or other suitable substrate, with magnetizable material deposited on one or both sides of the disk 108. The magnetic layer has tiny domains of magnetization for storing data transferred through read/write (R/W) heads 114. In an embodiment of a system in accordance with the present invention for use with methods as described herein, each R/W head 114 is a magnetic transducer adapted to read data from the disk 108 and write data to the disk 108. The disk 108 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other magnetic media and need not be limited to rotatable media. Further, the invention described herein is equally applicable to devices having any number of disks attached to the spindle motor 120. In other embodiments, the R/W head 114 includes a separate read element and write element. For example, the separate read element can be a magneto-resistive head, also known as an MR head. It will be understood that multiple head configurations can be used.

The R/W head 114 is operably associated with a rotary actuator 110 that can sweep an arc between an inner diameter (ID) of the disk 108 and an outer diameter (OD) of the disk 108. Upper and lower magnet return plates (not shown) and at least one magnet that together form the stationary portion of a voice coil motor (VCM). A voice coil (not shown) is mounted to the rotary actuator 110 and positioned in an air gap of the VCM. The rotary actuator 110 pivots about the bearing 112 when current is passed through the voice coil and pivots in an opposite direction when the current is reversed, allowing for precise positioning of the R/W head 114 along the radius of the disk 108. Each side of a disk 108 can have an associated R/W head 114, and the R/W heads 114 can be collectively coupled to the rotary actuator 110 such that the R/W heads 114 pivot in unison. The invention described herein is equally applicable to devices wherein the individual heads separately move some small distance relative to the actuator. This technology is referred to as dual-stage actuation (DSA).

Figure 2:
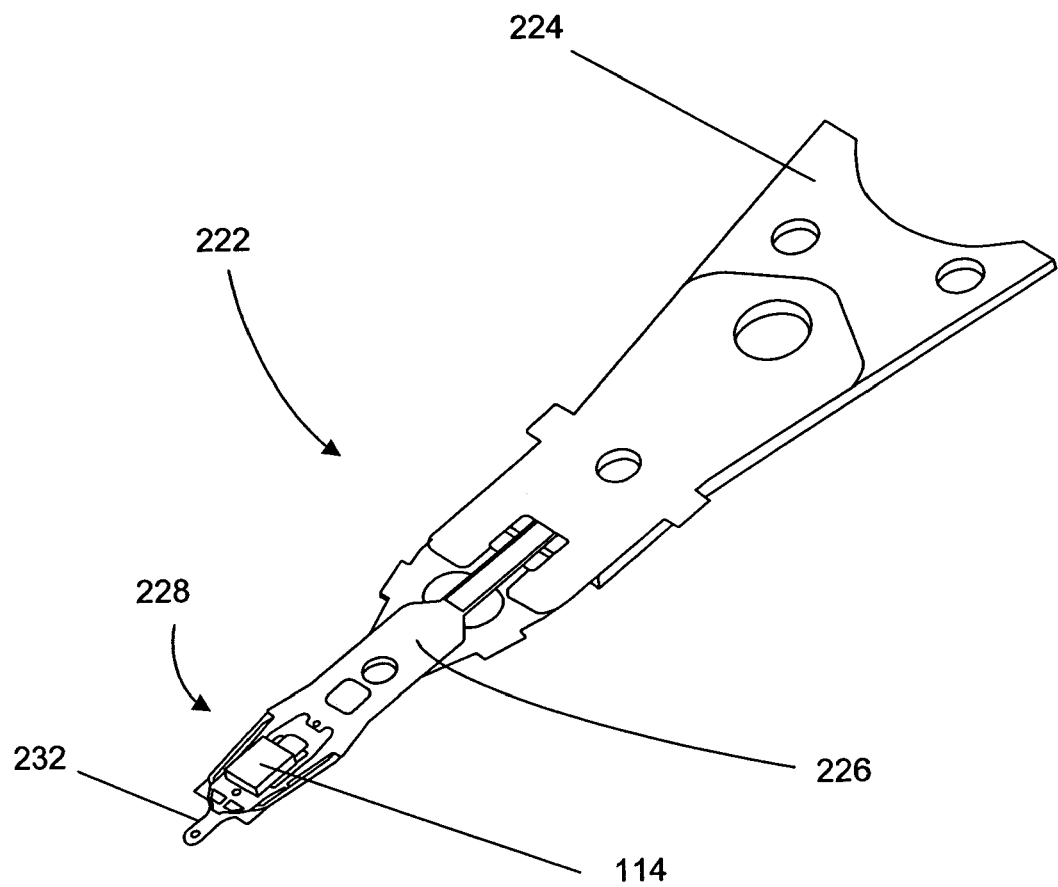
FIG. 2 is a close-up view of a head suspension assembly used in the HDD of FIG. 1, showing head, slider and suspension.

Referring to FIG. 2, a subassembly commonly referred to as a head suspension assembly (HSA) 222 is associated with the rotary actuator 110, and comprises the R/W head 114 formed on a slider 228, which is further connected with a flexible suspension member (a suspension) 226. The suspension 226 can be connected with an arm 224 which in an embodiment can be either integrally formed with a mount for a bearing 112 or separately attached to the mount. The R/W head 114 can be formed on the slider 228 using a number of different techniques, for example the R/W head 114 and slider 228 can be manufactured on a single die using semiconductor processing (e.g. photolithography and reactive ion etching). Spinning of the disk 108 increases air pressure between the slider 228 and the surface of the disk 108, creating a thin air bearing that lifts the slider 228 (and consequently the head 114) off of the surface of the disk 108. A micro-gap of typically less than one micro-inch can be maintained between the disk 108 and the R/W head 114 in an embodiment. The suspension 226 can be bent or shaped to act as a spring such that a force is applied to the disk 108 surface. The air bearing resists the spring force applied by the suspension 226, and the opposition of the spring force and the air bearing to one another allows the R/W head 114 to trace the surface contour of the rotating disk 108—which is likely to have minute warpage—without "crashing" against the disk 108 surface. When a R/W head 114 "crashes," the head 114 collides with the disk 108 surface such that the R/W head 114 and/or the disk 108 surface may be damaged. As is well understood by those of ordinary skill in the art, not all heads ride an air bearing as described above.

It should be noted that the description herein of the disk surface passing under or beneath the slider is intended to refer to that portion of the disk surface that is in close proximity to the slider. It will be understood that when referred to as "beneath" or "under" the slider, the disk surface can be over or adjacent to the slider in actual physical relation to the slider. Likewise, it will be understood that when referred to as "over" the disk surface, the slider can be beneath or adjacent to the disk surface in physical relation to the disk surface.

Referring again to FIG. 1, a servo system for positioning the R/W head 114 can comprise a microprocessor 146 and a servo controller, the servo controller existing as circuitry within the HDD 100 or as an algorithm resident in the microprocessor 146, or as a combination thereof. In other embodiments, an independent servo controller can be used. The servo system uses positioning data read by the R/W head 114 from the disk 108 to determine the position of the R/W head 114 over the disk 108. When the servo system receives a command to position an R/W head 114 over a track, the servo system determines an appropriate current to drive through the voice coil and commands a VCM driver 140 electrically connected with the voice coil to drive the current. The servo system can further include a spindle motor driver 142 to drive current through the spindle motor 120 and rotate the disk(s) 108, and a disk controller 144 for receiving information from a host 152 and for controlling multiple disk functions. The host 152 can be any device, apparatus, or system capable of utilizing the HDD 100, such as a personal computer, Web server, or consumer electronics device. An interface controller can be included for communicating with the host 152, or the interface controller can be included in the disk controller 144. In other embodiments, the servo controller, VCM driver 140, and spindle motor driver 142 can be integrated into a single application specific integrated circuit (ASIC). One of ordinary skill in the art can appreciate the different means for controlling the spindle motor 120 and the VCM.

A flexible circuit (not shown) is connected with the rotary actuator 110 to supply current to the voice coil and to provide electrical connections to the R/W heads 114, allowing write signals to be provided to each R/W head 114 and allowing electrical signals generated during reading to be delivered to pre-amplification circuitry (pre-amp) 148. Commonly, the flexible circuit comprises a polyimide film carrying conductive circuit traces connected at a stationary end and at a moving end to the rotary actuator 110. The disk controller 144 provides user data to a read/write channel 150, which sends signals to the pre-amp 148 to be written to the disk(s) 108. The disk controller 144 can also send servo signals to the microprocessor 146, or the disk controller 144 can control the VCM and spindle motor drivers directly, for example where multi-rate control is used. The disk controller 144 can include a memory controller for interfacing with buffer memory 156. In an embodiment, the buffer memory 156 can be dynamic random access memory (DRAM). The microprocessor 146 can include integrated memory (such as cache memory), or the microprocessor 146 can be electrically connected with external memory (for example, static random access memory (SRAM) 154 or alternatively DRAM).

Figure 3:
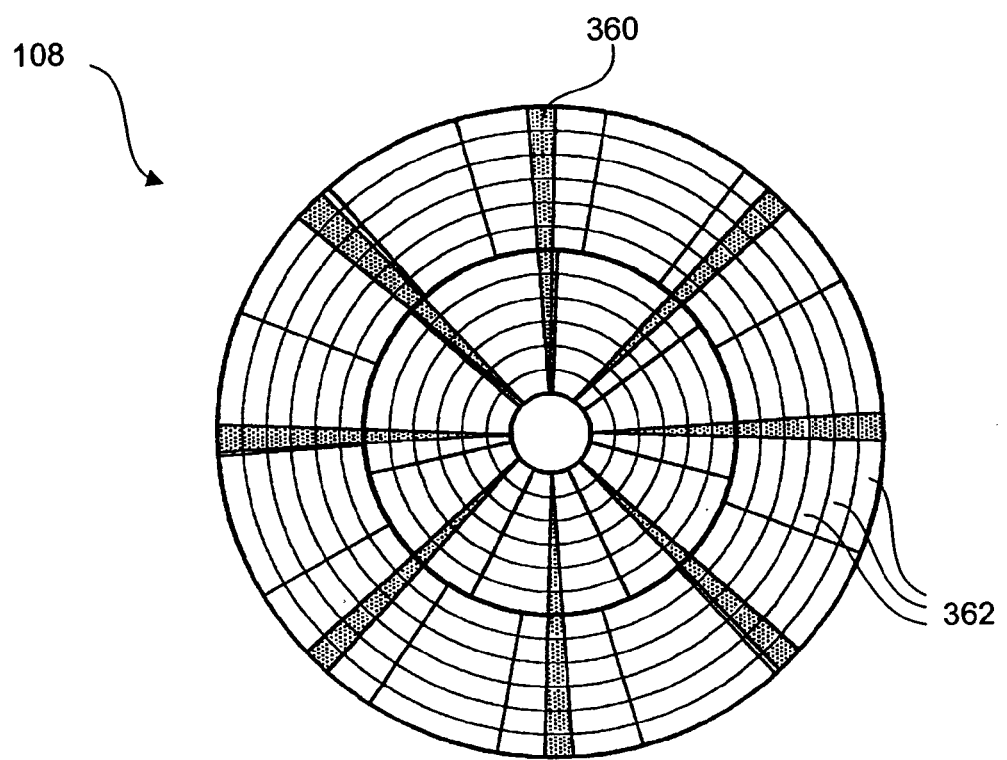
FIG. 3 is a diagram showing an example of a data and servo format for a disk in the HDD of FIG. 1.

The information stored on a disk 108 can be written in concentric tracks, extending from near the ID to near the OD, as shown in the exemplary disk of FIG. 3. In an embedded servo-type system, servo information can be written in servo wedges 360, and can be recorded on tracks 362 that can also contain data. Data tracks written to the disk surface can be formatted in radial zones. Radial zones radiating outward from the ID can be written at progressively increased data frequencies to take advantage of an increase in linear velocity of the disk surface directly under a head in the respective radial zones. Increasing the data frequencies increases the data stored on the disk surface over a disk formatted at a fixed frequency limited at the ID by a circumference of a track at the ID. In a system where the actuator arm rotates about a pivot point such as a bearing, the servo wedges may not extend linearly from the ID to the OD, but may be curved slightly in order to adjust for the trajectory of the R/W head 114 as it sweeps across the disk 108.

Figure 4:
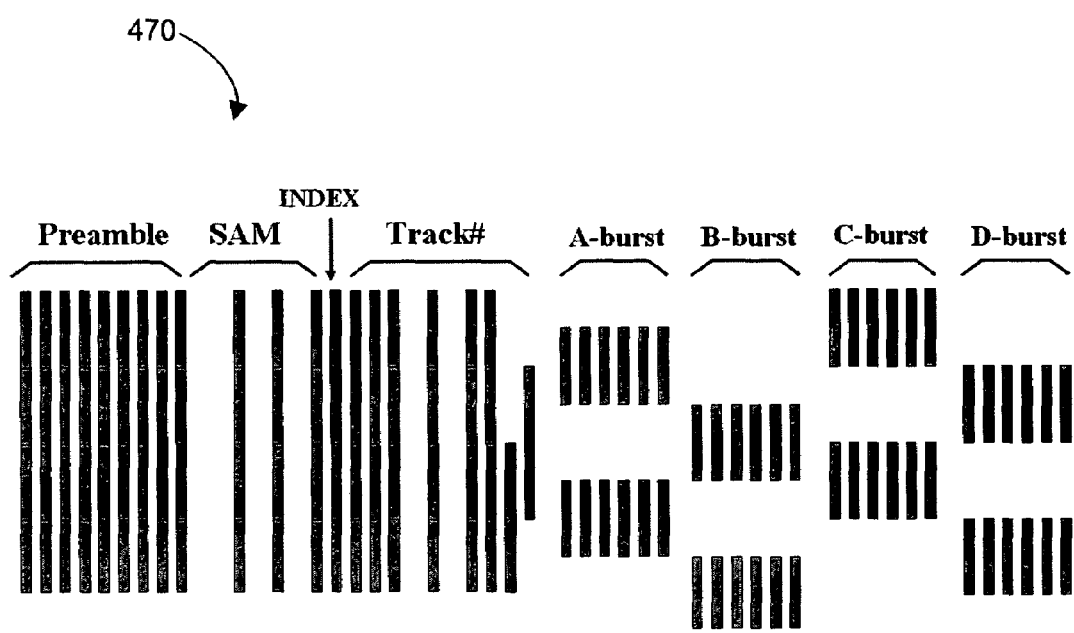
FIG. 4 is a partial detailed view of a disk from the HDD shown in FIG. 1 having a final servo pattern.

FIG. 4 illustrates a portion of a servo pattern 470 within a servo wedge 360. The servo pattern 470 includes information stored as regions of magnetization. For example, where the servo pattern 470 is longitudinally magnetized, grey blocks are magnetized to the left and white spaces are magnetized to the right, or vice-versa. Alternatively, where the servo pattern 470 is perpendicularly magnetized, grey blocks are magnetized up and white spaces are magnetized down, or vice-versa. Servo patterns 470 contained in each servo wedge are read by the R/W head 114 as the surface of the spinning disk 108 passes under the R/W head 114. The servo patterns 470 can include information identifying a data field. For example, the servo pattern 470 can include a servo address mark (SAM), track identification, an index, servo bursts, a phase lock loop (PLL), etc. The exemplary final servo pattern is a simplification of a typical servo pattern. The servo information can be arranged in any order, and can include many more transition pairs than are illustrated (for example, the region containing track identification is truncated as shown, and commonly includes many more transition pairs than are illustrated). Further, additional information, such as partial or complete wedge number information, can be included in the final servo pattern. One of ordinary skill in the art can appreciate the myriad different arrangements of information that can be contained in a servo pattern. Systems and method in accordance with embodiments of the present invention should not be construed as being limited in scope to those examples provided herein.

To write data, current is applied to the R/W head 114 in one direction (i.e., a positive direction) or current is applied to the R/W head 114 in an opposite direction (i.e., a negative direction) generating opposite magnetic fields. The current can change (or not change) once every cycle of a write clock. Thus, magnetization can change at clock cycle edges. Data can be defined by a series of ones and zeroes corresponding to the magnetic field generated by the R/W head 114. A convention can be employed wherein the same write clock is used for writing and reading the same data from the media. A PLL can be locked to the basic frequency when writing, and locked to the signal read back from the R/W head 114 when reading. Thus, data can be written and read at specific time intervals. Given a write current waveform, such as shown in FIG. 5A, the magnetic recording material can be magnetized in one direction when a positive current 590 is applied to the R/W head 114, and another direction when a negative current 592 is applied to the R/W head 114. When passing the R/W head 114 over the media and reading the media, a switch in magnetization results in a pulse 596, as shown in FIG. 5B. The fringe fields from the magnets can cause fringing of the magnetic field. The R/W head 114 passing over the magnetic field detects the fringing field.

Figure 6A:
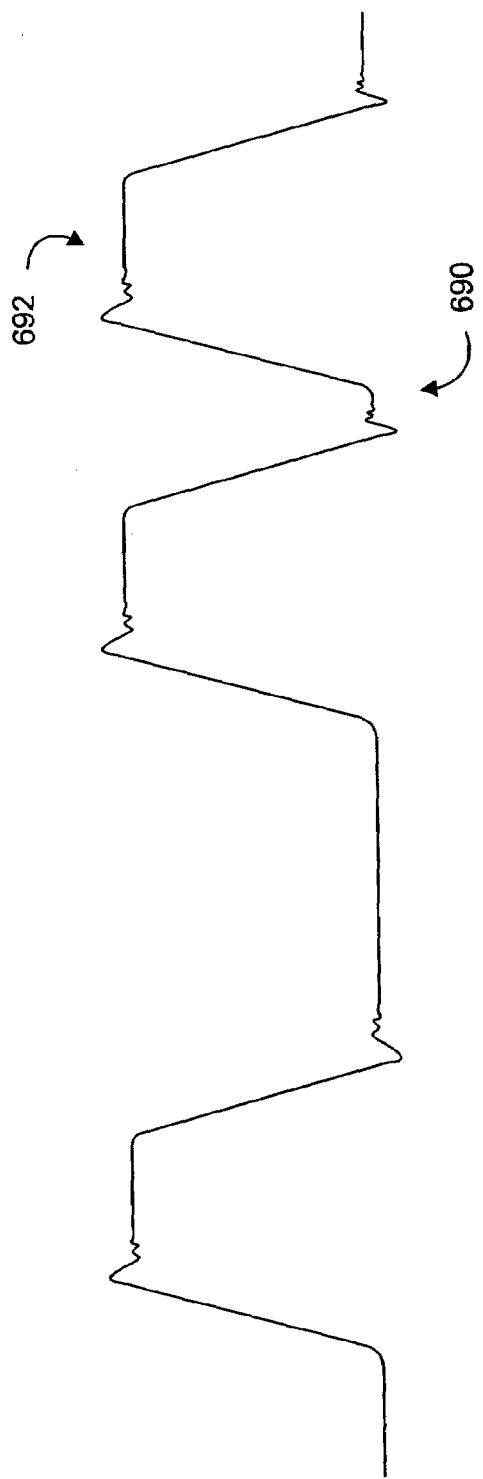
FIG. 6A is a write current waveform having a plurality of current transitions arranged in relatively close proximity such that linear superposition results in a pattern.
Figure 6B:
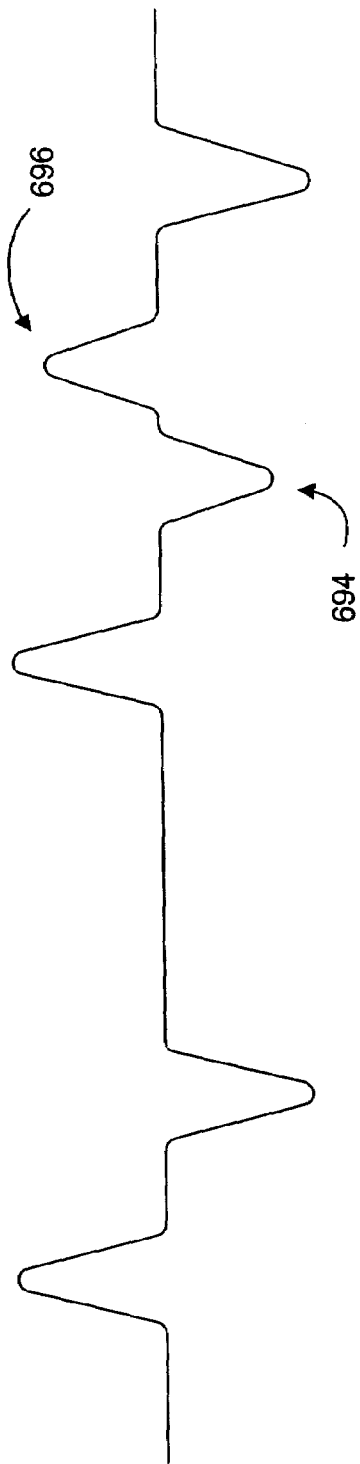
FIG. 6B is a plot showing a transducer signal obtained from the write current waveform of FIG. 6A.

Pulses are preferably written close together to increase areal density, thereby increasing storage space. As transitions are written closer and closer, the pulses begin to overlap. As a result, a minus pulse from one transition and a plus pulse from the adjacent transition can influence each other and the total signal from the two pulses will be a sum of a portion of the two pulses. For example, as shown in FIG. 6A a write current waveform including a first write current transition 690 associated with one clock cycle and a second write current transition 692 associated with another clock cycle can produce a peak signal (also referred to herein as a transducer signal) as shown in FIG. 6B. A first peak signal 694 resulting from the first write current transition 690 and a second peak signal 696 resulting from the second write current transition 692 interfere with each other. As a result of interference, an amplitude of the first peak signal 694 and the second peak signal 696 will be attenuated relative to an amplitude of a typical peak signal (e.g., a third peak signal 698). Thus it can be said that the first peak signal 694 and the second peak signal 696 are not preferably arranged, relative to one another. Such a phenomenon can be considered one of linear superposition.

At very high frequencies, nonlinear interference can occur. Where the arrangement of first and second peak signals 794, 796 have only linear interference, the first and second peak signals 794,796 are as shown in FIG. 7A. However, the actual arrangement of the first and second peak signals 795,797 will be closer together due to nonlinear interference, and the first and second peak signals will be further attenuated, as shown in FIG. 7B. One solution for avoiding nonlinear interference is to alter the write time of the transition so that the transition does not correspond exactly with the clock cycle edge. Write pre-compensation can shift the transition by a fraction of the clock. For example, where the clock is a very high speed clock (e.g., a gigahertz clock), the clock cycle can be one nanosecond in length, yet even at such speeds it can be desirable to shift some fraction of a clock cycle. Circuits exists for shifting the transition some fraction of the clock cycle (either a certain amount of delay or advance). While the write current waveform is asymmetric, the resulting pulse can preferably be more nearly symmetric relative to pulses written with a write current waveform synced with the clock cycle. Shifting the write times thus can at least partially avoid a problem on the media.

The write current waveform can be pattern dependent, so that where two transitions are very close together, it can be desirable to separate the transitions by some fraction of a clock cycle to minify interference where there is likely to be interference. However, where a gap between pulses is large, it can be desirable not to modify the write current waveform, but rather to apply current according to the clock cycle. The channel can therefore be instructed to slightly alter the placement of transitions based on the pulse pattern to be written to the media.

Referring to FIG. 8A, given a pattern 890 including a write current having a relatively long time gap 892 between transitions, followed by a region 894 wherein the transitions are relatively very close together in time, followed by another long time gap 896 between transitions. Referring to FIG. 8B, the first transition 891 within the highly active region 894 can be shifted forward a fraction of a clock cycle so that the first transition 891' of the modified pattern 890' occurs prior to the first transition of the original pattern 890, while the last transition 893 within the highly active region 894 can be shifted behind a fraction of a clock cycle so that the last transition 893' of the modified pattern 890' occurs after the last transition the last transition 893 of the original pattern 890. Neither shift will negatively affect the data. Indeed, the final pattern is more closely matched to a desired final pattern, than if the pattern had been written strictly according to the clock cycle because nonlinear interference caused by close proximity of the transitions in the writing is avoided. Write pre-compensation can be applied in a controlled fashion so that the final pattern is recorded substantially where intended. The pre-compensation patterns can be tuned for each HDD 100, and/or each R/W head 114 of an HDD 100, and/or each sector on a disk 108. (Note that a sector is commonly the smallest physical storage unit on a recording medium).

A technique can include an HDD wherein a set of pre-compensation parameters is provided for pre-defined temperatures and/or temperature ranges to generate write current waveforms in an R/W head 114. Write pre-compensation is typically applied on a pattern dependent basis. The HDD can apply write pre-compensation on a temperature dependent basis. The non-linear interference exhibited by adjacent transitions during writing can be exacerbated, or simply different for different temperatures or temperature ranges. An HDD 100 can include a temperature sensor that detects a temperature at or below a low temperature threshold. The low temperature threshold detection signals the servo system to apply an appropriate set of write pre-compensation parameters corresponding to the environmental conditions to the write current waveform generator. The corresponding set of write pre-compensation parameters can be retained in memory and can be applied as values taken from a database or other collection of information, such as a table. Alternatively, the write pre-compensation parameters can be calculated from an equation, or obtained using some technique other than calculation or selection. Alternatively, the HDD can apply one of a plurality of sets of pre-compensation parameters, the plurality of sets being applied to a corresponding temperature range and/or temperature.

Figure 9:
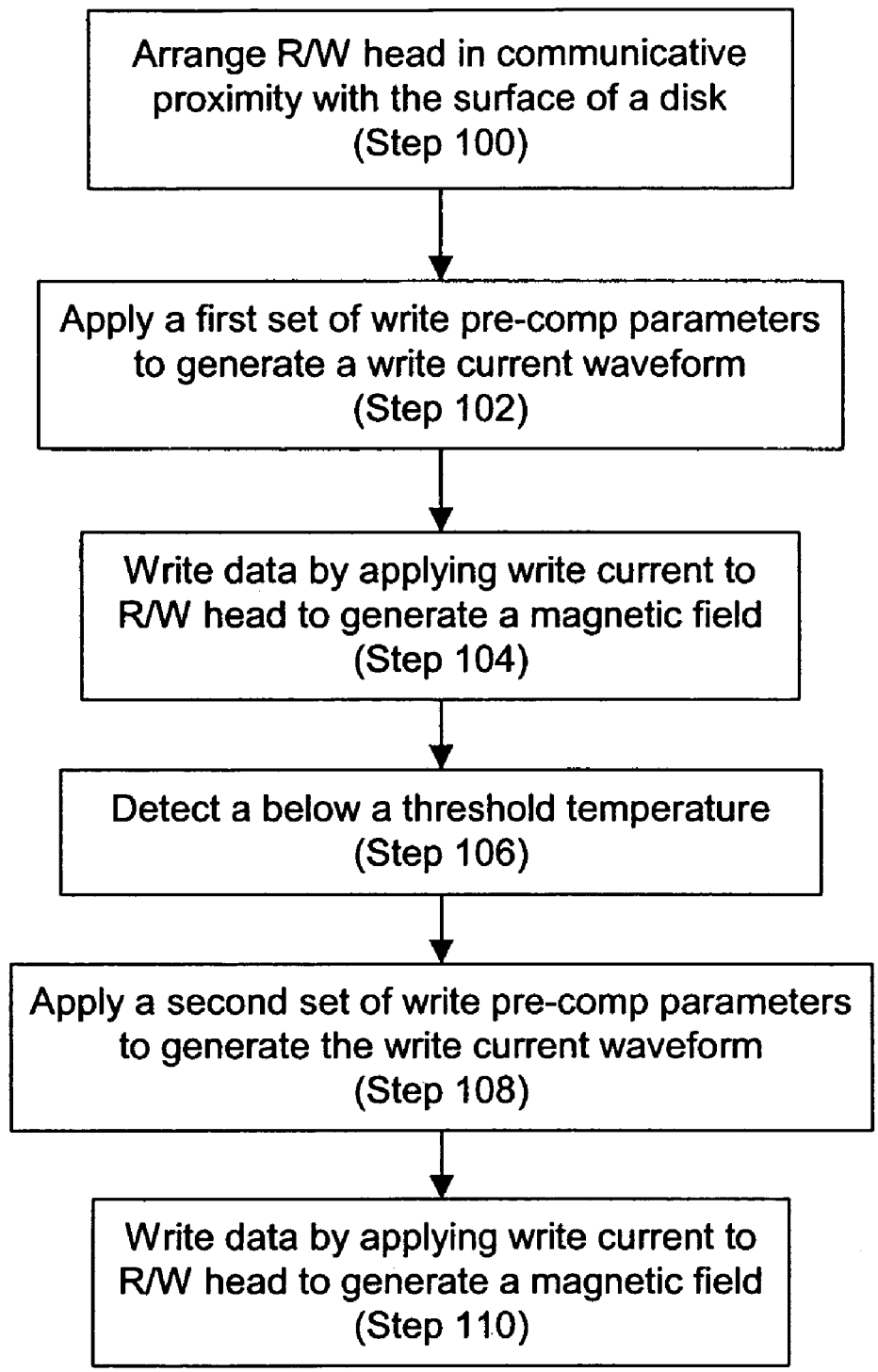
FIG. 9 is a flowchart illustrating incorporation of pre-compensation parameters in a write current waveform at low temperatures.

FIG. 9 is a flowchart of a technique for writing an indicia on a media using an R/W head adapted to generate a magnetic field when a write current waveform is applied to the R/W head. The R/W head can be arranged over a disk so that the R/W head is in communicative proximity with the surface of the disk (Step 100). The R/W head is in communicative proximity with the disk when the R/W head can read from and write to the disk. When the HDD operates in an environment having baseline conditions (i.e., where the humidity, temperature, etc. match those arbitrarily chosen as "baseline"), a first set of write pre-compensation parameters can be applied by the servo system to generate a write current waveform (Step 102). As information is written to the disk, the write current can be applied to the R/W head, thereby generating a magnetic field sufficient to switch magnetism of the disk as desired (Step 104). When a temperature of the HDD is detected below a threshold temperature (Step 106), a second set of write pre-compensation parameters can be applied by the servo system to generate the write current waveform (Step 108). As information is written to the disk at a temperature of the HDD below the threshold temperature, the write current generated based on the second set of write pre-compensation parameters can be applied to the R/W head thereby generating a magnetic field sufficient to switch magnetism of the disk as desired (Step 110).

Applying write pre-compensation parameters as a function of temperature can further be combined with other techniques for improving writing of a written indicia, such as those techniques described above. For example, in addition to applying write pre-compensation parameters, one or both of an increase in write current and an adjustment in write current edge break can be applied when the temperature drops below a low temperature threshold. The write pre-compensation parameters need not be applied at the same threshold as another technique. Further, multiple sets of write pre-compensation parameters can be applied at varying temperature ranges, while another technique may be applied only when the temperature is below a specific threshold. The techniques described herein can be combined in myriad different ways. Systems and methods in accordance with the present invention are meant to be applied to such techniques that incorporate application of write pre-compensation parameters as a function of temperature. One of ordinary skill in the art will appreciate the myriad different ways in which techniques can be combined to minify nonlinear interference in transitions.

It is desirable that a set of pre-compensation parameters or an equation for generating such a set of pre-compensation parameters be determined during the manufacturing process. For example, the pre-compensation parameters for an HDD 100 can change in a prescribed fashion. Alternatively, a first set of pre-compensation parameters can be determined by tuning an R/W head of the HDD 100 at a baseline temperature and humidity. The HDD 100 can then be cooled and the R/W head can be tuned at a second temperature to determine a second set of pre-compensation parameters. Alternatively, the HDD 100 can be tested and tuned at room temperature to determine a first set of pre-compensation parameters, heated up with operation of the HDD 100 (as a result, in part, of the spinning of the disks), and retested and retuned for a second set of pre-compensation parameters. The desired pre-compensation parameters for a cold temperature and/or cold temperature range can be extrapolated from the first and second sets of pre-compensation parameters.

Figure 10:
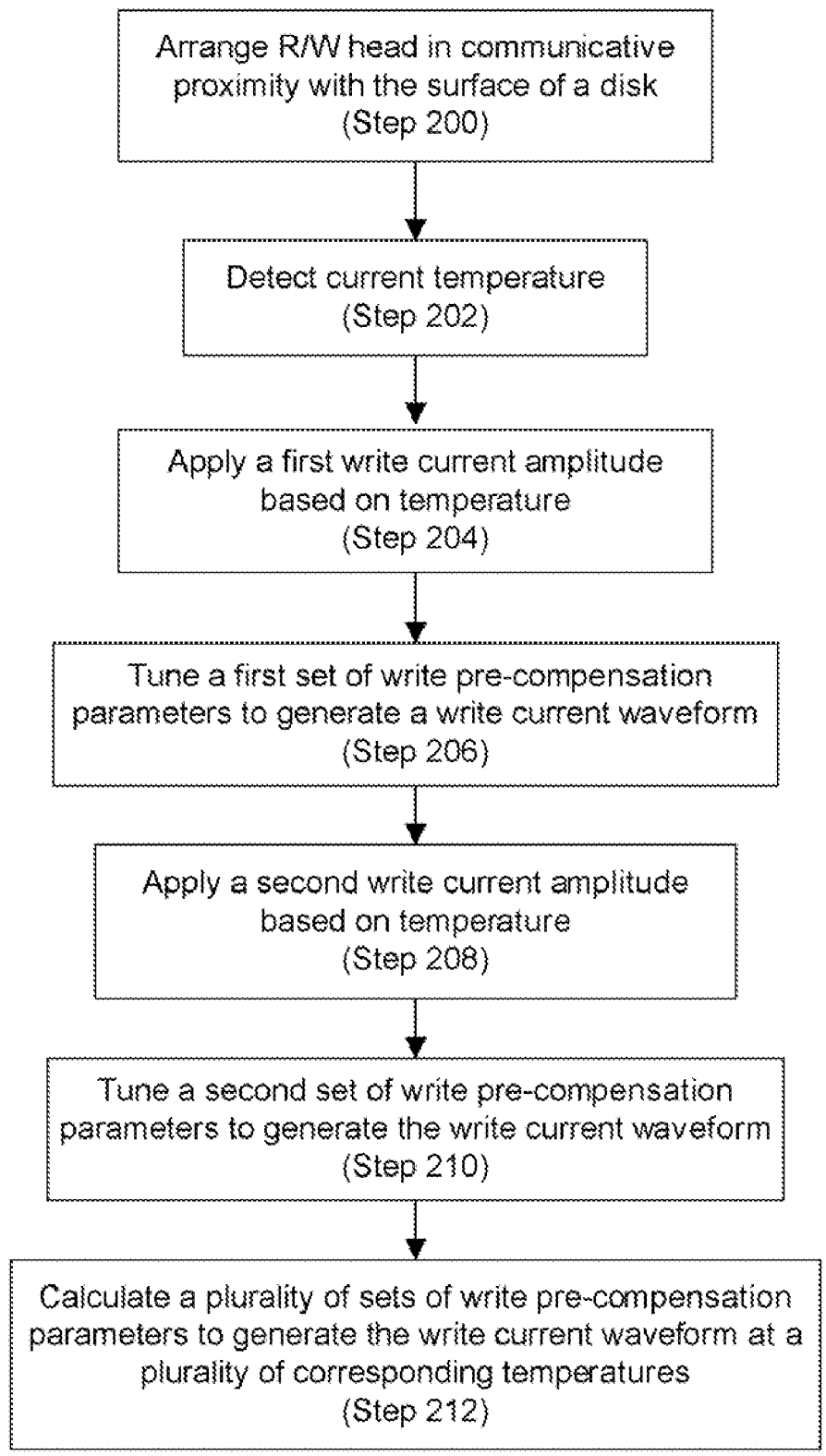
FIG. 10 is a flowchart of an embodiment of a method in accordance with the present invention for determining pre-compensation parameters for use in generating a write current waveform a plurality of temperatures.

FIG. 10 is a flowchart of an embodiment of a method for determining pre-compensation parameters in accordance with the present invention. A first set of pre-compensation parameters (also referred to herein as a first reference set) can be determined by tuning an R/W head 114 of the HDD 100 at baseline conditions (including, e.g., temperature and humidity), while applying a first write current to the R/W head 114. As shown, the R/W head 114 is arranged in communicative proximity with the surface of the disk (Step 200). A first temperature of the HDD 100 is determined (Step 202) and a first write current is applied based on the temperature (Step 204). The first set of write pre-compensation parameters are then tuned to generate the desired write current waveform (Step 206). The HDD 100 can use a second, lower write current and the R/W head 114 can be tuned at (substantially) the baseline conditions to determine a second set of pre-compensation parameters (also referred to herein as a second reference set). As shown, a second temperature of the HDD 100 can be determined (or verified) and a second write current is applied based on the second temperature (which in an embodiment is substantially the same as the first temperature) (Step 208). The second set of write pre-compensation parameters are then tuned to generate the desired write current waveform (Step 210).

The desired set of pre-compensation parameters for a cold temperature and/or cold temperature range can be extrapolated from the first and second sets of pre-compensation parameters (Step 212). The desired set of pre-compensation parameters for additional temperatures and/or temperature ranges can similarly be extrapolated from the first and second sets of pre-compensation parameters. Such a method applied at substantially the same environmental conditions can be performed without preparing a test chamber for temperature control when determining a second set of pre-compensation parameters for low temperature operation, thereby simplifying a test procedure and reducing test time. Further, requiring testing that includes changes in environmental conditions requires adding temperature control functionality to a test chamber. Such reductions in test procedure, time and complexity can potentially reduce manufacturing costs.

It should be noted that the desired write current waveform can also vary with temperature and/or temperature ranges. For example, it may be desired that the overshoot of the waveform be increased at a low temperature by adjusting the pre-amplification circuitry. Therefore, the desired waveform of the first write current can be different from the desired waveform of the second write current. Embodiments of methods in accordance with the present invention can include compensating for such variation in desired waveform, for example during tuning of the pre-compensation parameters or during extrapolation of a desired set (or sets) of pre-compensation parameters.

The write pre-compensation parameters are tuned by applying the write pre-compensation parameters and writing data to the magnetic recording material using the R/W head 114. The data can then be read by the R/W head 114 and characterized to determine how well a transition shift has been compensated or countered. The write pre-compensation parameters can be adjusted and the data rewritten until a satisfactory compensation is determined. In this fashion each HDD 100 can be individually tuned. In some embodiments, each R/W head 114 of a HDD 100 can be tuned. In still other embodiments a defined zone of a disk 108 (e.g., a sector) in an HDD 100 can be tuned for each R/W head 114 of the HDD 100.

The foregoing description of the present invention has been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method to determine a low temperature set of write pre-compensation parameters for a read/write head writing to a magnetizable material, the method comprising:
    applying a first write current to the read/write head at a first temperature;
    tuning the read/write head to obtain a first set of write pre-compensation parameters, the first set of write pre-compensation parameters instructing a read/write channel to modify placement of transitions relative to the clock cycle;
    applying a second write current to the read/write head at a second temperature;
    tuning the read/write head to obtain a second set of write pre-compensation parameters, the second set of write pre-compensation parameters instructing a read/write channel to modify placement of transitions relative to the clock cycle; and
    determining the low temperature set of write pre-compensation parameters based on the first set and second set of write pre-compensation parameter; and
    wherein tuning the read/write head to obtain a first and second set of write pre-compensation parameters includes:
        applying one of the first and second set of write pre-compensation parameters to generate a write current waveform;
        writing data to the rotatable medium;
        reading the data from the rotatable medium; and
        characterizing the data from the rotatable medium;
        determining an adjustment in the one of the first and second set of write pre-compensation parameters.

2. A method to determine a plurality of sets of write pre-compensation parameters for a read/write head writing to a magnetizable material, the method including:
    applying a first write current to the read/write head;
    tuning the read/write head to obtain a first reference set of write pre-compensation parameters, the first reference set of write pre-compensation parameters instructing a read/write channel to modify placement of transitions relative to the clock cycle;
    applying a second write current to the read/write head;
    tuning the read/write head to obtain a second reference set of write pre-compensation parameters, the second set of write pre-compensation parameters instructing a read/write channel to modify placement of transitions relative to the clock cycle; and
    determining the plurality of sets of write pre-compensation parameters based on the first reference set and second reference set of write pre-compensation parameters; and
    wherein tuning the read/write head to obtain a first and second reference set of write pre-compensation parameters includes:
        applying one of the first and second reference sets of write pre-compensation parameters to generate a write current waveform;
        writing data to the rotatable medium;
        reading the data from the rotatable medium; and
        characterizing the data from the rotatable medium;
        determining an adjustment in the one of the first and second reference sets of write pre-compensation parameters.

3. A method to determine a plurality of sets of write pre-compensation parameters corresponding to a plurality of operating temperature ranges for a read/write head writing to a magnetizable material, the method including:
    measuring a first temperature of the rotatable medium;
    applying a first write current to the read/write head;
    tuning the read/write head to obtain a first reference set of write pre-compensation parameters, the first reference set of write pre-compensation parameters instructing a read/write channel to modify placement of transitions relative to the clock cycle;
    measuring a second temperature of the rotatable medium;
    applying a second write current to the read/write head;
    tuning the read/write head to obtain a second reference set of write pre-compensation parameters the second set of write pre-compensation parameters instructing a read/write channel to modify placement of transitions relative to the clock cycle; and
    determining the plurality of sets of write pre-compensation parameters based on the first reference set and second reference set of write pre-compensation parameters; and
    wherein tuning the read/write head to obtain a first reference set of write pre-compensation parameters includes:
        applying the first reference set of write pre-compensation parameters to generate a first write current waveform;
        writing data to the rotatable medium;
        reading the data from the rotatable medium; and
        characterizing the data from the rotatable medium;
        determining an adjustment in the first reference set of write pre-compensation parameters.

4. The method of claim 3, wherein tuning the read/write head to obtain a second reference set of write pre-compensation parameters includes:

applying the second reference set of write pre-compensation parameters to generate a second write current waveform;
writing data to the rotatable medium;
reading the data from the rotatable medium; and
characterizing the data from the rotatable medium;
determining an adjustment in the second reference set of write pre-compensation parameters.

5. The method of claim 3, wherein determining the plurality of sets of write pre-compensation parameters includes one of extrapolating and interpolating the first and second reference sets of write pre-compensation parameters.

6. The method of claim 5, wherein the one of extrapolating and interpolating is a linear function.

* * * * *